US007184933B2

(12) United States Patent
Prekeges et al.

(10) Patent No.: US 7,184,933 B2
(45) Date of Patent: Feb. 27, 2007

(54) PERFORMANCE ESTIMATION TOOL FOR DATA STORAGE SYSTEMS

(75) Inventors: David Prekeges, Rocklin, CA (US); Woodson Long, Rocklin, CA (US); Donald Wake, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 24 days.

(21) Appl. No.: 10/376,533

(22) Filed: Feb. 28, 2003

(65) Prior Publication Data

US 2004/0172220 A1 Sep. 2, 2004

(51) Int. Cl.
*G06F 11/30* (2006.01)

(52) U.S. Cl. .................... 702/186; 709/223
(58) Field of Classification Search ............. 702/186, 702/182, 184, 120; 711/54, 114; 405/13; 700/17; 709/223; 365/189.05, 185.22; 370/342; 375/152

See application file for complete search history.

(56) References Cited

U.S. PATENT DOCUMENTS

| 5,142,469 | A   | * | 8/1992  | Weisenborn ................ 700/17 |
| 5,164,969 | A   |   | 11/1992 | Alley et al. |
| 5,623,598 | A   |   | 4/1997  | Voigt et al. |
| 5,960,451 | A   | * | 9/1999  | Voigt et al. ................ 711/114 |
| 6,622,221 | B1  | * | 9/2003  | Zahavi ....................... 711/154 |
| 2002/0040309 | A1 | * | 4/2002 | Powers et al. ................ 705/7 |
| 2002/0110421 | A1 | * | 8/2002 | Fowler ........................ 405/13 |
| 2003/0061331 | A1 | * | 3/2003 | Nakamura et al. .......... 709/223 |
| 2003/0110421 | A1 | * | 6/2003 | Kurinami et al. ............. 714/47 |
| 2004/0102925 | A1 | * | 5/2004 | Giffords ..................... 702/182 |

* cited by examiner

*Primary Examiner*—Michael Nghiem
*Assistant Examiner*—Xiuqin Sun

(57) ABSTRACT

A tool for estimating performance of a data storage system includes a database containing performance data for a plurality of possible data storage system configurations; and a computer or processor for receiving user input defining a data storage system configuration, retrieving recorded performance data corresponding to the data storage system configuration from the database, and calculating estimated performance data for the data storage system configuration based on the data from the database.

27 Claims, 6 Drawing Sheets

PERFORMANCE ESTIMATION TOOL FOR DATA STORAGE SYSTEMS

BACKGROUND

The use of computers and computer networks pervade virtually every business and other enterprise in the modern world. With computers, users generate and receive vast quantities of data that can be stored for a variety of purposes. This storehouse of data can grow at a phenomenal pace and become critically valuable to those who have generated it. Thus, to be successful in today's economy, companies should seek to obtain the most efficient, cost effective, and best performing Information Technology solutions they can afford. Because data storage has become one of the most important components in that Information Technology infrastructure, there is an ever-present need for data storage systems that improve on capacity, speed, reliability, etc.

In a single computer, the primary data storage device is usually a hard drive with a storage capacity measured in gigabytes. Additionally, computers may store data using such devices as CD-ROM drives, floppy disk drives, tape drive, etc. Within a computer network, the computers of the network may also store data on -network servers or other data storage devices, such as those mentioned above, that are accessible through the network. For larger systems with even greater data storage needs, arrays of data storage disks may be added to the network. Such an array of data storage disks is sometimes referred to as a Redundant Array of Independent (or Inexpensive) Disks (RAID).

Storage Area Networks (SANs) are technology being implemented to accommodate high-capacity data storage devices, particularly disk arrays, within a network. Essentially, a SAN is a high-speed network between client devices, such as networked personal computers and servers, and data storage devices, particularly disk arrays. In most cases, a SAN overcomes the limitations and inflexibility of traditional attached data storage.

Where disk arrays and/or a SAN are implemented as a data storage solution, it is important to match the performance of the array or arrays with the data storage needs of the network. This raises the issue of how to determine or predict the performance of a particular data storage configuration. In other words, how can enough of the right performance data be communicated to aid a solution designer in predicting the performance limitations of an array?

The answer can be complex and difficult. There are many factors to consider when looking at the performance of a data storage solution. These include the characteristics of the client devices (e.g., networked computers and servers), the workload, and the disk array itself. Understanding the limitations of the disk array would aid the solution designers and technical consultants, and would also help field engineers as they try to debug or optimize the data storage solution.

In the past, these issues have been addressed on a configuration-by-configuration basis. When one of the almost infinite possible data storage system configurations is implemented and tested, performance data can be documented in, for example, a white paper. However, each such paper gives performance data specific to the data storage system configuration being documented. Thus, it is easy to see why countless such papers exist, one for each tested configuration. However, due to small variations in configuration or operating conditions, one can often find multiple papers on similar configurations with no consensus in the recorded results. Alternatively, there may be no paper available at all on the configuration a designer is considering.

SUMMARY OF SELECTED EMBODIMENTS

In one of many possible embodiments, a tool for estimating performance of a data storage system includes a database comprising performance data for a plurality of possible data storage system configurations; and a computer or processor for receiving user input defining a data storage system configuration, retrieving recorded performance data corresponding to the data storage system configuration from the database, and calculating estimated performance data for the data storage system configuration based on the data from the database.

In another possible embodiment, a method of estimating performance of a data storage system includes receiving user input defining a data storage system configuration; retrieving recorded performance data corresponding to the data storage system configuration from a database; and calculating estimated performance data for the data storage system configuration based on the data from the database.

In another possible embodiment, a method of doing business in which data storage equipment is sold includes defining performance criteria desired from a data storage system; proposing a data storage system configuration in accordance with the performance criteria; and validating the proposed data storage system configuration against the performance criteria with an automated performance estimation tool.

BRIEF DESCRIPTION OF THE DRAWINGS

The accompanying drawings illustrate various selected embodiments of the present invention and are a part of the specification. The illustrated embodiments are examples of the present invention and do not limit the scope of the invention.

FIG. 3 also shows how the illustrated method can be implemented in the software illustrated in FIG. 2.

Throughout the drawings, identical reference numbers designate similar, but not necessarily identical, elements.

DETAILED DESCRIPTION OF SELECTED EMBODIMENTS

This specification describes methods and systems that can be used to estimate the performance of a data storage system, e.g., a disk array. The estimated performance data can be used to help diagnose an existing data storage system or select an optimal configuration for a system being designed. Among other things, the specification describes a Performance Estimation Tool ("PET") that can be used to produce estimated performance data for a particular data storage system.

Figure 1:
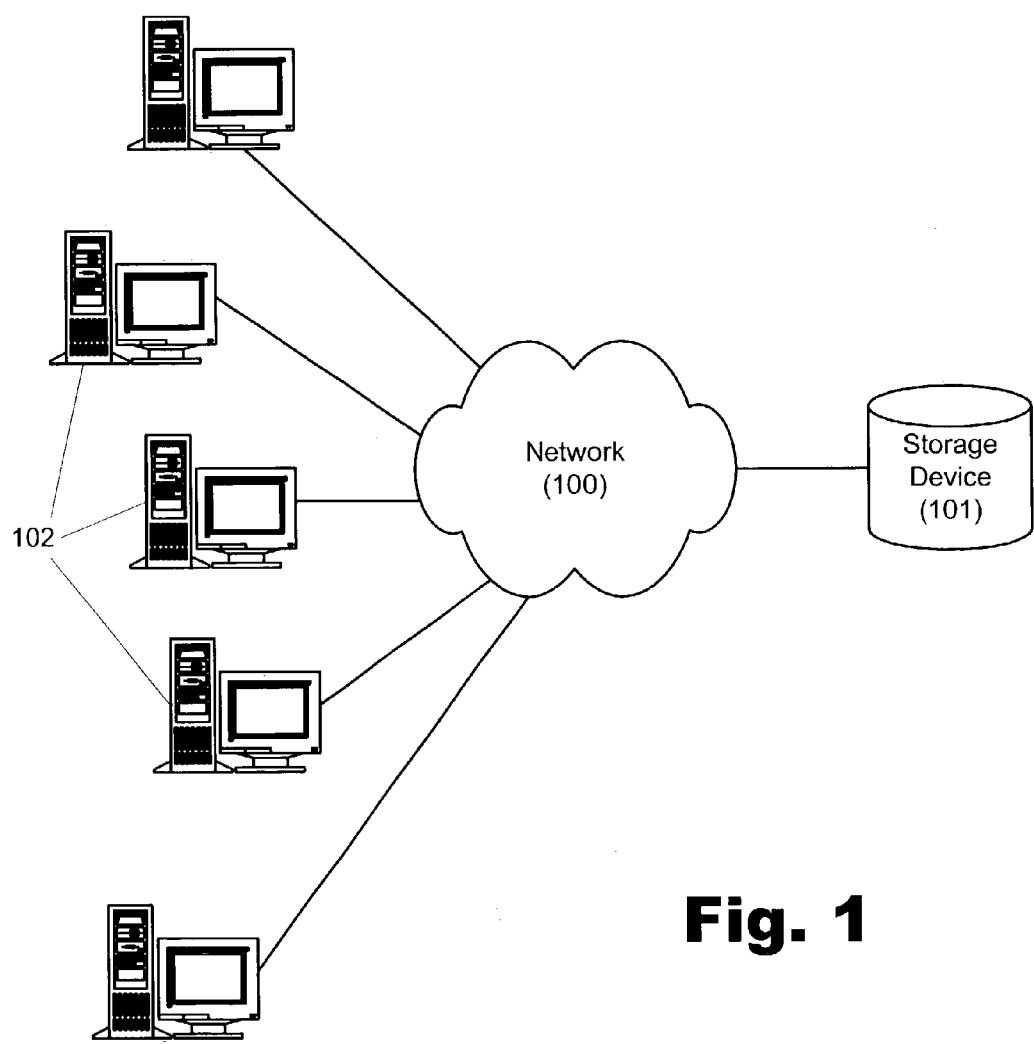
FIG. 1 is an illustration of a network with an implemented data storage solution which can be evaluated using embodiments of the present invention.

FIG. 1 illustrates a network with an implemented data storage system that can be evaluated using the PET disclosed herein. As shown in FIG. 1, a number of client devices (102), for example, personal computers, laptops, servers, etc., are connected to a network (100). Also connected to the network (100) is a data storage device (101).

The client devices (102) can store data to, and retrieve data from, the storage device (101) through the network (100). In this way, each client device (102) has additional data storage resources available beyond the data storage capacity of that client device itself.

In many cases, the data storage device (101) will include one or more arrays of data storage disks. Such a disk array is also referred to as a Redundant Array of Independent (or Inexpensive) Disks (RAID). As indicated above, a common data storage device used in a Storage Area Network (SAN) is a disk array or RAID. As used herein, a disk array or RAID is defined as two or more hard drives or other data storage disks that provide data storage for connected client devices.

Redundant Arrays of Independent (or Inexpensive) Disks are intended to provide storage with better performance and reliability than individual disks. In the pursuit of better performance or better reliability, numerous RAID types have been devised. Each of these RAID types or levels has different reliability and performance characteristics.

For example, one RAID Type is called Type-1. With a Type-1 RAID, data that is written to one disk is simply mirrored to another, second disk. Thus, data stored in a Type-1 RAID is very reliable because all the data is stored twice and is, therefore, automatically backed up against inadvertent error or corruption.

In a Type-1 disk array with N disks, there are N/2 disks worth of data storage space, and up to N/2 different input or output operations (I/O) can be accommodated at any given time (one I/O per 2 disks in the array). Thus, a Type-1 RAID sacrifices storage capacity to a certain extent in favor of higher reliability and performance.

Another RAID Type-is called Type-5. In Type-5 RAID, one disk's worth of parity information is calculated from the other disks in the array. Parity refers to an integer's property of being odd or even. Parity checking is used to detect and correct errors in binary-coded data, including data stored on a disk array, such as a RAID.

Therefore, in a Type-5 disk array with N disks, there are N-1 disks worth of data storage space. However, when a write command is entered into a Type-5 array, the array must first read from two disks as part of the parity calculation and then write to two disks afterward. As a result, a Type-5 array can only handle about half as many input/output commands in a given amount of time as a Type-1 array. Thus, a Type-5 array has a larger storage capacity for a given number of disks at the sacrifice of some input/output speed.

Given this general information, it becomes apparent that each RAID Type-has its own strengths and weaknesses. A Type-5 array can fit more user data onto a given number of disks than can a Type-1 array. However, a Type-5 array processes input/output commands at a rate only about half that of a Type-1 array.

The strengths and weaknesses of individual RAID types have given rise to the hierarchical storage array. In a hierarchical storage array, data is moved from RAID Type-to RAID Type-based on certain criteria in order to try to obtain more of the strengths and less of the weaknesses than each of the individual RAID types offer by themselves.

The PET disclosed herein allows users to input some basic information about the configuration of a data storage system, e.g., a disk array. The system may be a proposed system under consideration or an existing system in need of study. The basic information input may include, for example, the number of disks, the disk types, the RAID type or level, the number of front-end and back-end controllers, and the intensity of the workload.

Using these inputs, the PET outputs an estimation of the performance characteristics of the data storage system. As will be described in more detail below, the estimation of performance is based on real performance measurements and may include an estimation of the Input/Output per second (IO/sec), megabytes per second (MB/sec), and response time of the data storage system for various specified workloads.

Figure 2:
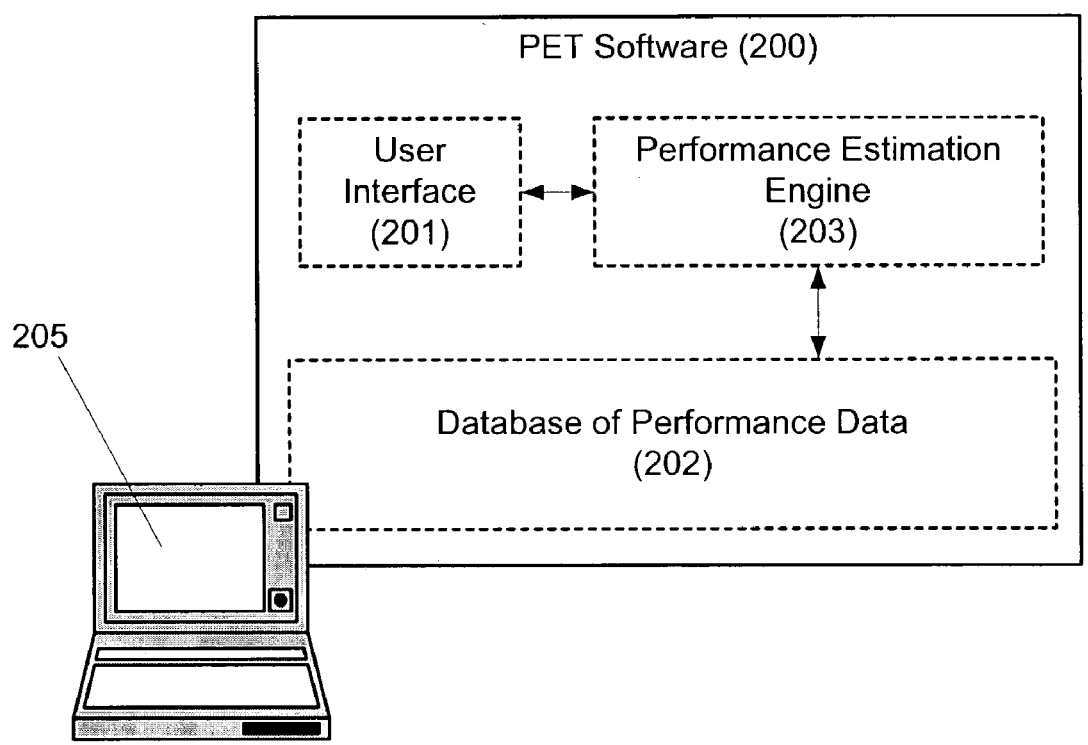
FIG. 2 is an illustration of the software and hardware of a data storage performance estimation tool according to an embodiment of the present invention.

FIG. 2 is an illustration of the software and hardware of one possible embodiment of the data storage PET. As shown in FIG. 2, the PET may essentially be a piece of software (200) that can be executed by any general-purpose computer. This software can be stored on any medium for storing computer-readable instructions, including, but not limited to, a hard drive, floppy disk, CD-ROM, etc. Alternatively, the PET software could be implemented as, for example, firmware for a processor, an application-specific integrated circuit (ASIC) or a combination of hardware and software in a dedicated performance estimation tool.

In the embodiment of FIG. 2, the PET software (200) is installed on a laptop or notebook computer (205). This has the advantage of allowing the PET to be highly portable. Consequently, a designer or field engineer can use the PET at any location, including on-site with a data storage system being studied.

In the example of FIG. 2, the PET software (200) comprises three principal components, a user interface (201), a performance estimation engine (203) and a database of performance data (202). The database (202) may be part of the PET software (200) or may be a separate data structure. Each of these components will be described in detail below.

The user interface (201) is preferably a graphical user interface and allows the user to input information about the data storage system that is to be studied, i.e., for which performance estimates are desired. This may be a planned system being studied by a designer or an existing system being studied by a field engineer.

Based on the user's inputs, the performance estimation engine (203) will generate the desired performance estimates using the data in the database (202). The user interface (201) will then provide the performance estimates to the user. This output may be in numeric or graph form, or both. The user interface (201) may also allow the user to specify in what form the performance estimates are displayed.

The database of performance data (202) is a database that contains performance data for the field of possible configurations and components of a data storage system. This data is used by the performance estimation engine (203) to generate or lookup estimated performance data for the user-defined configuration specified by the input through the user interface (201).

To generate the database (202), a variety of different data storage system configurations and components are tested under various conditions (e.g., workloads) and the performance results are recorded. Because of the huge field of possible configurations, it would be extremely difficult to test and record actual performance data for each possible configuration. Consequently, a more efficient approach is to measure performance data for a selected subset of the possible configuration field and then interpolate that data to provide performance data for the entire field. Disk arrays can contain different types and sizes of physical disk mechanisms, but these variations can be accounted for in the database (202).

For example, in a large RAID, there may be 1,024 disks in the array. In order to plot a reasonable performance curve, 12 capacity or performance points to be measured are chosen spanning the operational range of the array. There are approximately 10 possible intensity levels (loads) per disk. That makes the total array load intensity some value between 1 and 10,000. It is sufficient, for example, to measure only 10 different intensities at each performance point.

There 1-to-4 possible configuration choices for the Front-End Controllers (FECs) and Back-End Controllers (BECs) in a disk array. In this example, it is sufficient to measure two of the possible configurations, e.g., configurations 1 and 4. This data is then interpolated, including for the untested configurations 2 and 3. The interpolated data for the untested configurations can then be spot-checked to ensure that the interpolations were accurate.

There are multiple disk types (sizes). The performance of each type/size can be measured as described above, i.e., a number of measured performance points are taken over the operation range of the disk and then interpolated. As described above, there are also multiple RAID types or levels (ways to configure the drives or disks in the array). Each RAID type is also measured for performance using a number of actual measurement points over the operating range, which points are then interpolated to complete the performance database.

There are literally infinite possible workloads to apply to a disk array. In this example, the five most common workloads—a combination of sequential, random, and different block sizes—are chosen for testing. The reported performance for a data storage system is then presented in terms of these five workloads.

In generating the database (202), it is useful to insure that the measured performance data reflects cache-avoidance operation. In other words, every effort is made to provide disk array performance data that is based solely on the performance of the back-end (or disk mechanism end) of the disk array without reflecting on any data caching capabilities of the data storage system. This is the most conservative performance data possible (minimal cache hits), but a good starting point for the PET.

Once the database (202) is constructed, the PET can be used to provide performance estimates over the entire field of possible data storage system configurations. The method of operating the PET will be described with reference to FIG. 3. FIG. 3 also illustrates how the method corresponds to operation of the three basic components of the PET software (200) shown in FIG. 2.

Figure 3A:
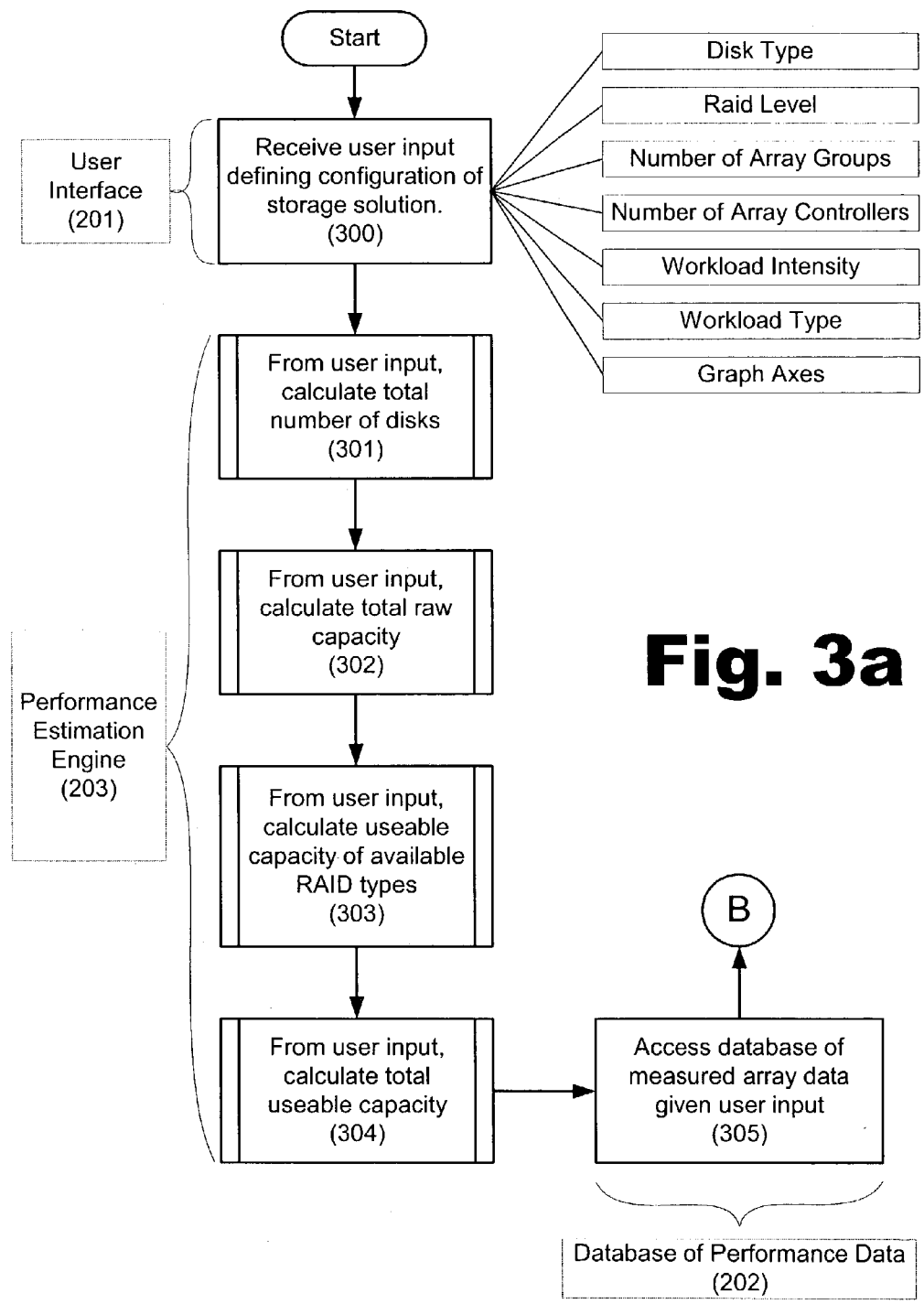
FIGS. 3a and 3b (collectively, "FIG. 3") are a flowchart illustrating a method of estimating data storage performance according to an embodiment of the present invention.

As shown in FIG. 3a, the user interface (201) is used to input data defining the configuration of the data storage system under study (Step 300). For example, this data may include the disk type, RAID type or level, the number of array groups, the number of controllers (FECs and BECs), the actual or expected workload intensity and the workload type.

The user may also specify through the interface how the performance data is to be displayed. For example, if the performance data is to be shown graphically as a performance curve, the user may specify the graph axes. The axes may be, for example, Capacity, IO/sec, or Response Time.

From this user input, the performance estimation engine (203) will perform a number of calculations. The engine (203) will calculate the total number of disks in the array (step 301), calculate the total raw capacity of the array (step 302), calculate the useable capacity of each RAID type available (e.g., the RAID type-1 useable capacity, the RAID type-5 useable capacity, etc.) (step 303) and the total useable capacity (step 304). With these numbers, the engine (203) can access the database (202) of performance data (including both actual and interpolated performance data) (step 305) and, given the user input defining the data storage configuration under study, obtain performance data for that configuration.

Figure 3B:
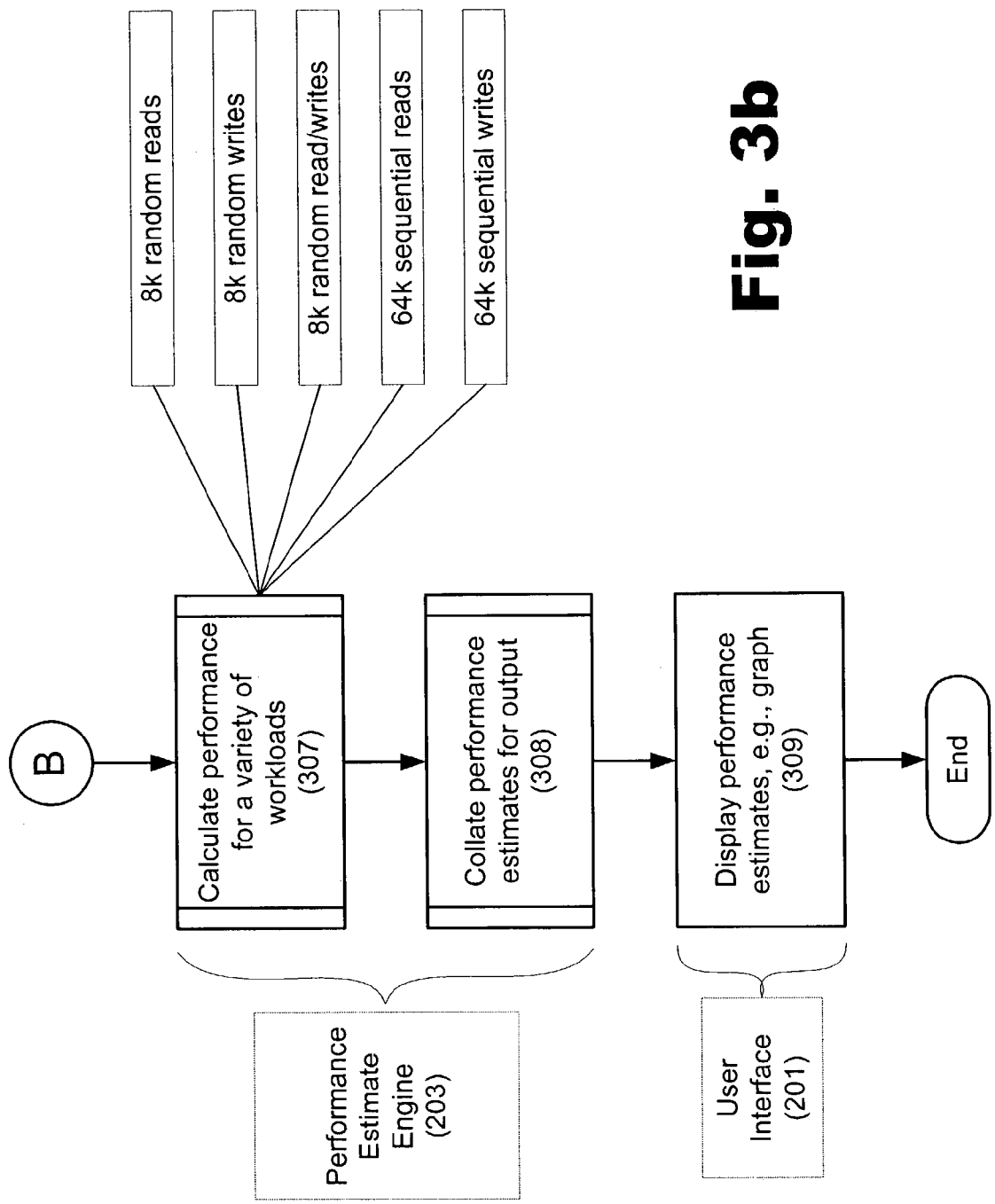

Proceeding to FIG. 3b, the engine (203) uses the retrieved performance data to calculate the performance of the data storage configuration being studied for a variety of different workloads (step 307). In the present example, five different workloads are used. The workloads chose are: 8 k random reads, 8 k random writes, 8 k random read/writes at a 60/40 mix, 64 k sequential reads and 64 k sequential writes.

The engine (203) then collates the performance estimates for display to the user (step 308). As noted, this display may include a graph of a performance curve plotting, for example, Capacity, IO/sec, or Response Time.

The user interface (201) then displays the performance data (step 309). As will be demonstrated below with regard to FIG. 4, this display may include tables showing the input data and output data, as well as a graph of the performance curve plotting the variables specified by the user.

Figure 4:
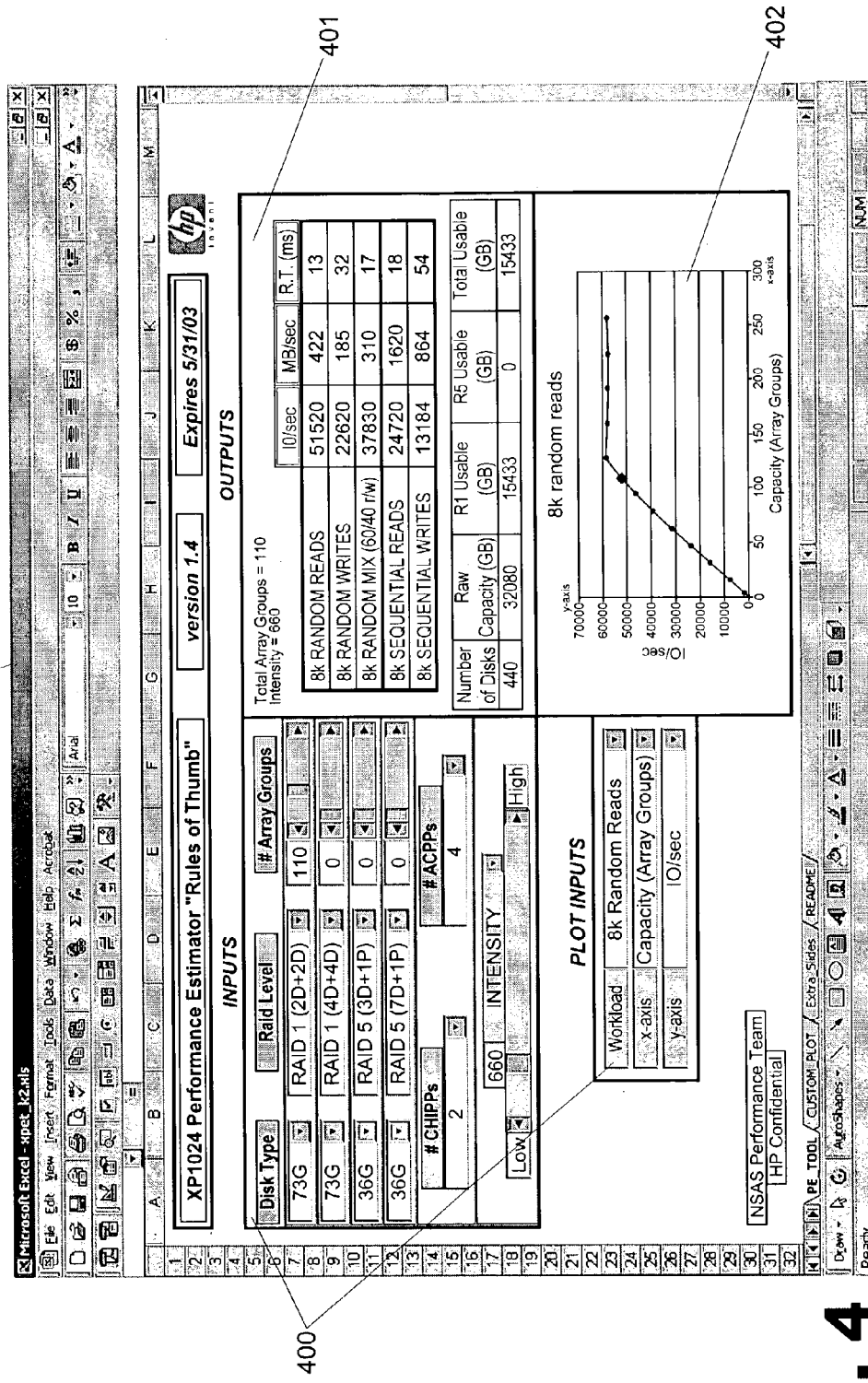
FIG. 4 is an illustration of a user interface for the software of FIG. 2 according to one embodiment of the present invention.

FIG. 4 illustrates an exemplary screen shot of a user interface for the PET. As shown in FIG. 4, the interface (201a) may include inputs (400), such as pull-down menus, data entry fields, and slides that allow the user to describe the data storage configuration to be studied and specify in what form the performance estimates are output. The resulting performance estimates may be shown on the same screen as both tabular data (401) and a graphed performance curve (402), e.g., a saturation or latency curve.

As illustrated in FIG. 4, one possible way to implement the PET is using Microsoft® Excel®. Excel includes a user interface with graphic capabilities. The database (202, FIG. 2) can be stored as an Excel spreadsheet file. The performance estimation engine (203, FIG. 2) can be created using the Visual Basic programming capability embedded in Excel. Consequently, Excel provides a readily-available means of constructing a PET.

An example of a portion of the engine (203, FIG. 2) written in visual basic for Excel follows:

```
For i = 3 To (NUM_OF_DIFFERENT_DISK_TYPES * NUM_OF_DIFFERENT_RAID_
 TYPES + 1)
    Value = Value + ((BasicValue * _
        (((Worksheets("equations").Range(LocalColumn & Row1).Value) * _
        IntensityRatio * CapacityRatio) + _
        ((Worksheets("equations").Range(LocalColumn & (Row1 + 1)).Value) * _
        IntensityRatio * (1 − CapacityRatio)) + _
```

-continued

```
        ((Worksheets("equations").Range(LocalColumn & Row2).Value) * _
            (1 – IntensityRatio) * CapacityRatio) + _
        ((Worksheets("equations").Range(LocalColumn & (Row2 + 1)).Value) * _
            (1 – IntensityRatio) * (1 – CapacityRatio)))) * _
        (DiskTypeAndRaidTypeRatiosArray(i) / TotalNumberOfArrayGroups))
    Call IncrementColumn(LocalColumn)
    Call IncrementColumn(LocalColumn)
Next i
```

Figure 5:
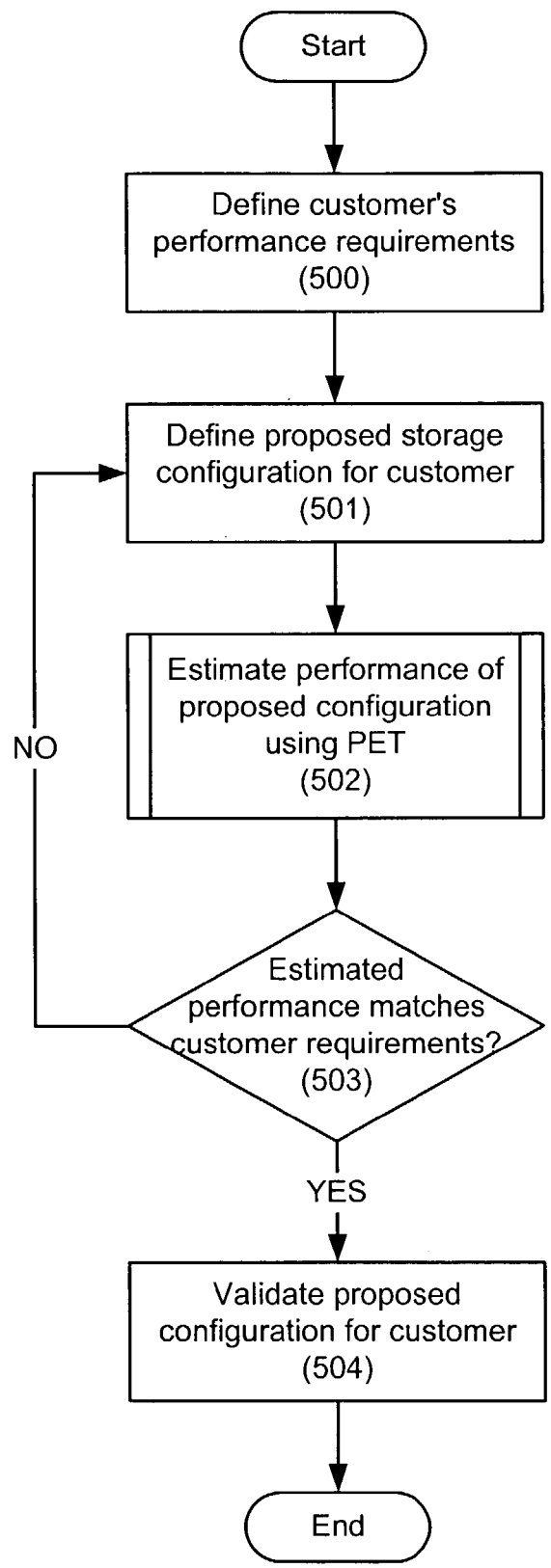
FIG. 5 is a flowchart illustrating a business method that uses the performance estimation tool of FIG. 2 according to one embodiment of the present invention.

As mentioned, the PET described herein can be used to test the viability of a proposed data storage system configuration based on anticipated performance demands. Alternatively, the PET can be used to diagnose the operation of an existing data storage system. The PET can also be used in a business method in which data storage equipment is being sold to or serviced for a potential customer. One example of such a business method is illustrated in FIG. 5.

Obviously, a potential customer of data storage equipment will want to know that the equipment purchased will meet the existing or anticipated data storage needs of that potential customer. As shown in FIG. 5, a sales professional can define with the customer what the performance requirements of that customer are (step 500). A storage solution, e.g., a particular data storage system configuration, can then be proposed to meet those requirements (step 501).

Once the storage solution is defined and proposed, the proposed data storage system configuration can be input to the PET described herein to test whether the solution will, in fact, meet the requirements defined by the customer (step 502). The PET then provides performance estimates for the proposed configuration.

The estimated performance of the proposed data storage solution is then compared to the performance requirements specified by the customer (determination 503). If the estimated performance matches or exceeds the customer's requirements, the proposed storage solution is validated and the customer can purchase with confidence that the data storage solution will meet the specified performance criteria (step (504).

If the performance estimates from the PET indicate that the proposed data storage solution will not meet the performance criteria specified by the customer, the solution can be re-designed. New solutions are then tested with the PET until a valid solution meeting the customer's performance criteria is reached.

The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A tool for estimating performance of a data storage system, said tool comprising:
   a database comprising performance data for a plurality of possible data storage system configurations; and
   a computer or processor for receiving user input defining a data storage system configuration, retrieving recorded performance data corresponding to said data storage system configuration from said database, calculating estimated performance data for said data storage system configuration based on the recorded performance data from said database, and outputting at least a portion of the estimated performance data to a user;
   wherein said database comprises:
      performance points obtained from testing a plurality of data storage system configurations; and
      data points obtained by interpolating between said performance points.

2. Software stored on a medium for storing computer-readable instructions, said software, when executed, causing a computer or processor to:
   receive user input defining a data storage system configuration including system components and RAID type or types;
   retrieve recorded performance data corresponding to said data storage system configuration from a database;
   calculate estimated performance data for said data storage system configuration based on the data from said database; and
   display at least a portion of said estimated performance data in a user interface.

3. The software of claim 2, wherein said software, when executed, further causes a computer or processor to display said estimated performance data as a graph of performance plotting variables specified by a user.

4. The software of claim 2, wherein said software, when executed, further causes a computer or processor to display a graph of said estimated performance data.

5. The software of claim 4, wherein a variable to be represented by each of two axes of said graph are specified by user input.

6. The software of claim 2, wherein said user input comprises disk type data for said data storage system; RAID type data for said data storage system; and a number of array controllers for said data storage system.

7. The software of claim 6, wherein said user input further comprises anticipated workload data for said data storage system.

8. The software of claim 2, wherein said estimated performance data is calculated for a plurality of workloads.

9. Software stored on a medium for storing computer-readable instructions, said software, when executed, causing a computer or processor to evaluate a data storage system by:
   receiving user input defining a data storage system configuration;
   retrieving recorded performance data corresponding to said data storage system configuration from a database;
   calculating estimated performance data for said data storage system configuration based on the data from said database; and
   outputting at least a portion of the estimated performance data to a user;

wherein said software, when executed, further causes a computer or processor to calculate said estimated performance data by:
calculating a total number of disks in said data storage system based on said user input;
calculating a total raw capacity of said data storage system based on said user input; and
calculating a total useable capacity of said data storage system based on said user input.

10. A method of estimating performance of a data storage system, said method comprising:
receiving user input defining a data storage system configuration including system components and RAID type or types;
retrieving recorded performance data corresponding to said data storage system configuration from a database;
calculating estimated performance data for said data storage system configuration based on the data from said database; and
displaying the estimated performance data to a user.

11. The method of claim 10, further comprising displaying said estimated performance data in a user interface.

12. The method of claim 11, wherein said displaying said estimated performance data comprising displaying a graph of said estimated performance data.

13. The method of claim 12, further comprising displaying said estimated performance data in a graph with user-specified axes.

14. The method of claim 10, wherein said user input comprises disk type data for said data storage system; RAID type data for said data storage system; and a number of array controllers for said data storage system.

15. The method of claim 14, wherein said user input further comprises anticipated workload data for said data storage system.

16. A method of estimating performance of a data storage system, said method comprising:
receiving user input defining a data storage system configuration;
retrieving recorded performance data corresponding to said data storage system configuration from a database;
calculating estimated performance data for said data storage system configuration based on the data from said database; and
performing one of outputting performance results to a user or storing at least a portion of the estimated performance data;
further comprising compiling said database by:
testing a plurality of data storage system configurations to obtain a plurality of performance points; and
interpolating between said performance points to complete said database.

17. A method of estimating performance of a data storage system, said method comprising:
receiving user input defining a data storage system configuration;
retrieving recorded performance data corresponding to said data storage system configuration from a database;
calculating estimated performance data for said data storage system configuration based on the data from said database; and
outputting performance results to a user or storing the estimated performance data;
wherein calculating said estimated performance data includes:
calculating a total number of disks in said data storage system based on said user input;
calculating a total raw capacity of said data storage system based on said user input; and
calculating a total useable capacity of said data storage system based on said user input.

18. The method of claim 17, further comprising calculating said estimated performance data for a plurality of workloads.

19. A device for estimating performance of a data storage system, said device comprising:
means for receiving user input defining a data storage system configuration including system components and RAID type or types;
means for retrieving recorded performance data corresponding to said data storage system configuration from a database;
means for calculating estimated performance data for said data storage system configuration based on the data from said database; and
means for displaying the estimated performance data to a user.

20. The device of claim 19, wherein said user input comprises disk type data for said data storage system; RAID type data for said data storage system; and a number of array controllers for said data storage system.

21. The device of claim 20, wherein said user input further comprises anticipated workload data for said data storage system.

22. The device of claim 19, wherein said means for calculating said estimated performance data calculated estimated performance data for a plurality of workloads.

23. A device for estimating performance of a data storage system, said device comprising:
means for receiving user input defining a data storage system configuration;
means for retrieving recorded performance data corresponding to said data storage system configuration from a database;
means for calculating estimated performance data for said data storage system configuration based on the data from said database;
means for displaying the estimated performance data to a user; and
means for compiling said database including:
means for testing a plurality of data storage system configurations to obtain a plurality of performance points; and
means for interpolating between said performance points to complete said database.

24. The device of claim 23, wherein said means for displaying said estimated performance data comprising means for displaying one of (1) an estimation of Input/Output of the data storage system and (2) response time of the data storage system.

25. The device of claim 23, wherein said means for displaying said estimated performance data comprising means for displaying a graph of said estimated performance data.

26. The device of claim 25, further comprising means for displaying said estimated performance data in a graph with user-specified axes.

27. A device for estimating performance of a data storage system, said device comprising:

means for receiving user input defining a data storage system configuration;

means for retrieving recorded performance data corresponding to said data storage system configuration from a database;

means for calculating estimated performance data for said data storage system configuration based on the data from said database; and means for outputting performance results to a user or storing the estimated performance data;

wherein said means for calculating said estimated performance data comprise:

means for calculating a total number of disks in said data storage system based on said user input;

means for calculating a total raw capacity of said data storage system based on said user input; and means for calculating a total useable capacity of said data storage system based on said user input.

* * * * *

UNITED STATES PATENT AND TRADEMARK OFFICE
CERTIFICATE OF CORRECTION

| | | |
|---|---|---|
| PATENT NO. | : 7,184,933 B2 | Page 1 of 1 |
| APPLICATION NO. | : 10/376533 | |
| DATED | : February 27, 2007 | |
| INVENTOR(S) | : David Prekeges et al. | |

It is certified that error appears in the above-identified patent and that said Letters Patent is hereby corrected as shown below:

In column 1, line 7, delete "modem" and insert -- modern --, therefor.

In column 1, line 24, delete "-network" and insert -- network --, therefor.

Signed and Sealed this

Twentieth Day of April, 2010

David J. Kappos
*Director of the United States Patent and Trademark Office*